United States Patent

Hamanaka et al.

[15] 3,640,761
[45] Feb. 8, 1972

[54] METHOD FOR ATTACHING ADDITIVE TO POLYAMIDE PELLETS

[72] Inventors: Yasushi Hamanaka; Hiromi Tajiri, both of Tsuruga; Kunioml Etoh; Kaoru Furukawa; Yukito Masai, all of Otsu, all of Japan

[73] Assignee: Toyo Boseki Kabushiki Kaisha, Osaka-shi, Osaka-fu, Japan

[22] Filed: Feb. 6, 1970

[21] Appl. No.: 9,175

[30] Foreign Application Priority Data

Feb. 6, 1969    Japan.....................................44/9150

[52] U.S. Cl. ..........................117/100 C, 117/69, 117/72, 117/138.8 N, 260/45.75 C, 260/78 SC
[51] Int. Cl. ...........................................................B44d 5/00
[58] Field of Search ................117/100 C, 161 UE, 138.8 N, 117/69, 72; 260/78 SC, 45.7 SC, 857 R

[56] References Cited

UNITED STATES PATENTS

| | | | |
|---|---|---|---|
| 2,996,466 | 8/1961 | Kessler et al.......................117/100 X |
| 3,156,665 | 11/1964 | Brossman et al..................117/100 X |
| 2,790,734 | 4/1957 | Kuhn et al........................117/138.8 X |
| 3,086,960 | 4/1963 | Bletso...............................260/78 X |
| 3,207,620 | 9/1965 | Roth................................117/138.8 X |
| 3,280,052 | 10/1966 | Wantanabe et al................260/45.7 S |

FOREIGN PATENTS OR APPLICATIONS 911,800   11/1962    Great Britain.........................117/100

*Primary Examiner*—Murray Katz
*Assistant Examiner*—Mathew R. P. Perrone
*Attorney*—Craig, Antonelli & Hill

[57] ABSTRACT

A method for fixation of an additive on pellets of polyamides which comprises coating a phenol derivative of the formula:

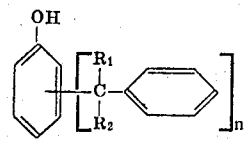

wherein $R_1$ and $R_2$ are each hydrogen or alkyl having not more than 4 carbon atoms and $n$ is an integer of 1 to 3 with or without a polyphenol derivative of the formula:

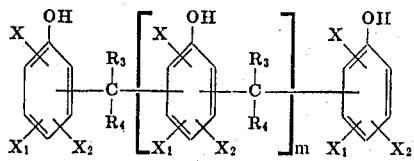

wherein X, $X_1$ and $X_2$ are each hydrogen, hydroxyl, alkyl having not more than 12 carbon atoms or alkoxy having not more than 12 carbon atoms, at least one of them being not hydrogen, $R_3$ and $R_4$ are each hydrogen, alkyl having not more than 4 carbon atoms or alkenyl having not more than 4 carbon atoms and $m$ is an integer of 2 to 6 on the pellets and then attaching the additive thereto.

7 Claims, 1 Drawing Figure

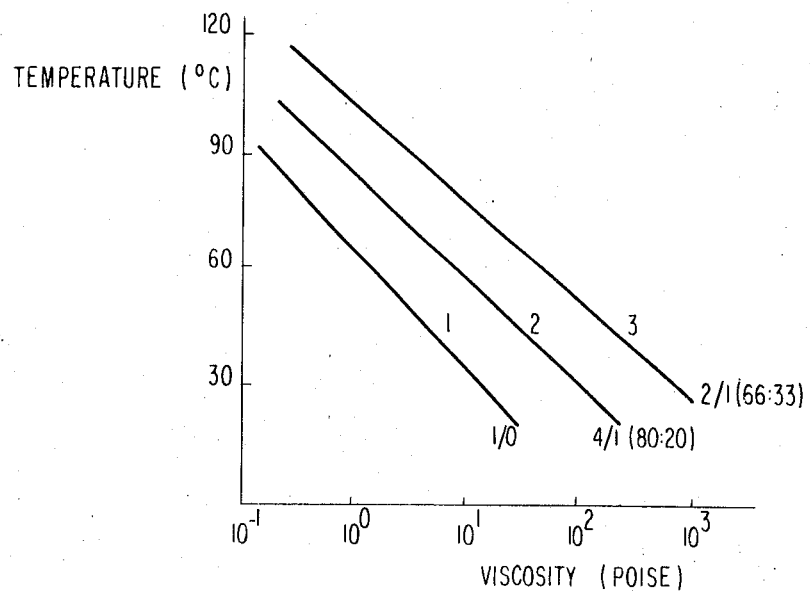

METHOD FOR ATTACHING ADDITIVE TO POLYAMIDE PELLETS

The present invention relates to a method for attaching a powdery or liquid additive to the surface of pellets of polyamides.

The drawing shows the relationship between the temperature and the viscosity of the support material.

On the production of fibers, films, injection-molding articles and the like from pellets of polyamides, various additives such as antioxidizing agents, pigments, light stabilizers, dyestuffs, fireproof agents, nucleating agents, and transparent agents are incorporated therein. In such case, the additives are usually attached on the pellets by the aid of a support material having adhesive property for assurance of the uniform dispersion in the products. For instance, a lower molecular weight polyamide, adiponitrile or the like has been used for fixing pigments on pellets of polyamides. A high melting point polymer provides a strong adhesive power, but such substance is required to apply in the form of solution or in the melt state. Further, the additives are obliged to be attached at a temperature higher than the melting point of the support material. Thus, the operation for surface treatment becomes complex and troublesome. On the other hand, a substance such as adiponitrile may be reacted with the polyamides or decompose the additives when the pellets are melted. Moreover, the adhesive power is not so strong and the application field is considerably limited.

As the result of the study seeking a support material for fixing additives on pellets of polyamides, which has an appropriate affinity to the pellets, provides an excellent adhesive power and extends well the additives on the pellets at a relatively low temperature, it has been found that a phenol derivative of the formula:

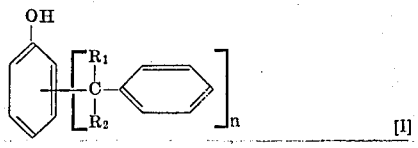

wherein $R_1$ and $R_2$ are each hydrogen or alkyl having not more than four carbon atoms (e.g., methyl, ethyl, propyl, isopropyl, butyl) and $n$ is an integer of 1 to 3 meets such demand. The fixation of the additives on the surface of the pellets is particularly satisfactory, when the following polyphenol derivative is used in combination with the phenol derivative [I]:

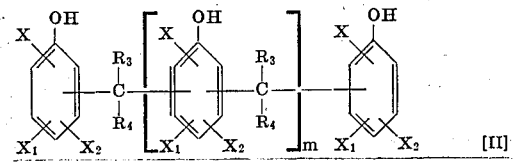

wherein $X$, $X_1$, and $X_2$ are each hydrogen, hydroxyl, alkyl having not more than 12 carbon atoms (e.g., methyl, ethyl, propyl, isopropyl, butyl, octyl, dodecyl) or alkoxy having not more than 12 carbon atoms (e.g., methoxy, ethoxy, propoxy, isopropoxy, butoxy), at least one of them being not hydrogen, $R_3$ and $R_4$ are each hydrogen, alkyl having not more than four carbon atoms (e.g., methyl, ethyl, propyl, isopropyl, butyl) or alkenyl having not more than four carbon atoms e.g., allyl, butenyl) and $m$ is an integer of 2 to 6. The present invention is based on the above finding.

According to the present invention, the fixation of an additive on pellets of polyamides is carried out by coating the phenol derivative [I] with or without the polyphenol derivative [II] on the pellets and then attaching the additive thereto.

As the phenol derivative [I], there may be usually employed styrenated phenol (a mixture of the styrene adducts of phenol wherein the number of the substituents is one to three). Still, in the formula [I], the phenylalkyl substituent(s) may be present at any position(s) of the o-, m-, and p-positions to the hydroxyl group.

The polyphenol derivative [II] is the reaction product of a substituted phenol with an alkyne, an aldehyde or a ketone specific examples of the phenol portion are methylpyenol, ethylphenol, isopropylphenol, t-butylphenol, t-amylpyenol, octylphenol, nonylphenol, dodecylphenol, dimethylphenol, methyl-t-butylphenol, hydroxyphenol, etc. Examples of the alkylidene or alkenylidene portion are methylene, ethylidene, propylidene, butylidene, hexylidene, allylidene, butenylidene, 1-methylethylidene, 1-methylbutylidene, 1-ethylbutylidene, etc. Still, in the formula [II], all the substituents other than the hydroxyl group may exist at any positions of the o-, m-, and p-positions to the hydroxyl group on the benzene ring.

As the additive to be fixed on the pellets, there may be exemplified antioxidizing agents, ultraviolet absorbers, fireproof agents, plasticizers, radical scavengers, nucleating agents, light stabilizers, transparent agents, pigments, dyestuffs, etc. In other words, thiodialiphatic acids, aromatic amines, organic phosphorus compounds, imidazoles, thiazoles, benzophenones, metal salts of aliphatic acids, salts of copper, nickel, tin, lead and manganese, organic antimony and titanium compounds, halogenated hydrocarbons, high molecular chelates, silica, alumina and the like may be attached on the pellets.

The temperature under which the coating and attaching operations are carried out may be appropriately decided on the viscosity of the support material. For instance, the relationship between the temperature and the viscosity of the support material consisting of a mixture of styrenated phenol as the phenol derivative [I] and the condensation product of p-propylphenol with acetaldehyde ($m=3$) as the polyphenol derivative [II] is shown in the logarithmic graph of the accompanying drawing wherein the solid lines 1, 2, and 3 are respectively for the mixtures at weight ratios of 1:0, 4:1 and 2:1. From the graph, it is understood that the support material can be varied widely in viscosity, i.e., from an entirely fluidizable liquid to a highly viscous liquid, within a relatively narrow scope of temperature by selecting a suitable composition of the support material. Thus, even coated pellets of high fluidizability are readily obtainable by treating the uncoated pellets with the said support material at about 100° C.

In practice, 100 parts by weight of the pellets are first coated with 0.05 to 0.5 part by weight of the support material consisting of the phenol derivative [I] alone or of a mixture of the phenol derivative [I] and the polyphenol derivative [II] at 80° to 120° C. for about 20 to 30 minutes in a rotating drum and then one or more additives are added thereto under rotation so as to attach the additives uniformly to the said pellets. When the support material consists of a mixture of the phenol derivative [I] and the polyphenol derivative [II], the weight ratio may be from 2:10 to 20:10, preferably from 5:10 to 20:10. The amount of the additive depends on its kind. For instance, the copper salt of an organic acid is ordinarily attached to the pellets in 0.05 to 0.1 percent by weight (in terms of copper) on the basis of the latter. Further, for instance, 2-mercaptobenzimidazole is normally attached in 0.1 to 1.0 percent by weight to the pellets.

The said coating and attaching operations may be effected, if necessary, with repetition. Further, when the additive is liquid, it may be previously incorporated into the support material so that coating and attaching are accomplished in a single operation.

Compared with known support materials, the phenol derivative [I] is advantageous in causing no coloration to the products manufactured from the pellets coated thereby. The combined use of the polyphenol derivative [II] is particularly advantageous in increasing the fatigue resistance and strengthening the adhesive power.

Practical and presently preferred embodiments of the present invention are illustratively shown in the following examples wherein parts are by weight.

The coefficient of dynamic friction is determined by the method described in "Kagaku Kogaku (Chemical Engineering)," Vol. 24, pp. 205 to 213 (1960).

EXAMPLE 1

In a rotary evaporator, there are charged 200 parts of dried cylindrical pellets of polycapramide (molecular weight, 23,500) of 2 mm. in diameter and 2 mm. in length, and 0.2 part of 2-($\alpha$-methylbenzyl)phenol is added thereto. The evaporator is rotated at about 50° C. for about 20 minutes so that the support material is attached uniformly to the pellets. One part of powdery copper acetate of less than 300 mesh is introduced into the evaporator, which is then rotated at about 50° C. for 20 minutes. The pellets are cooled, moved into a sieve of 20 mesh screen and shaken at an amplitude of 20 mm. with a frequency of 240 per minute for 10 minutes. Then, the pellets are subjected to melt spinning by the use of an extruder. The resultant filaments contain 98 percent by weight of the employed acetate copper dispersed uniformly.

For comparison, the above operations are carried out but using no support material. The resulting filaments include only 10 to 30 percent by weight of the employed copper acetate with unevenness.

EXAMPLE 2

In the same manner as in Example 1 but using an auxiliary support material further to the fundamental support material, pellets of polycapramide are coated with the support materials. The coated pellets are admixed with 1 part of powdery copper acetate and 1 part of 2-mercaptobenzimidazole while rotation for 60 minutes. The resultant pellets are cooled, shaken and subjected to melt spinning as in Example 1 to obtain filaments. The coefficient of dynamic friction determined on the pellets, the retention rate of copper on the filaments and the compression fatigue on the tire cords made of the filaments are shown in the following table:

TABLE

| Auxiliary support material | | | | | | | | | |
|---|---|---|---|---|---|---|---|---|---|
| X | $X_1$ | $X_2$ | $R_3$ | $R_4$ | $m$ | Amount used (parts) | Coefficient of dynamic friction ($\mu d$) | Retention rate of copper acetate (percent) | Goodlich compression fatigue (percent) |
| H | H | t-$C_4H_9$(p-position) | H | $CH_3$ | 4 | 0.5 | 0.32 | 98 | 68 |
| | | | | | | 1.0 | 0.22 | 100 | 79 |
| | | | | | | 2.0 | 0.19 | 100 | 80 |
| H | $CH_3O$ | t-$C_4H_9$ | H | $CH_3$ | 2-6 | 0.3 | 0.28 | 98 | 66 |
| | | | | | | 1.0 | 0.20 | 99 | 78 |
| | | | | | | 1.5 | 0.16 | 100 | 78 |
| H | H | HO (p-position) | H | 1-methylethylidene | 2-6 | 0.3 | 0.35 | 92 | 71 |
| | | | | | | 1.0 | 0.31 | 95 | 74 |
| | | | | | | 1.5 | 0.28 | 96 | 77 |
| Fundamental support material alone | | | | | | | 0.52 | 98 | 63 |
| No support material | | | | | | | 0.15 | | 64 |

EXAMPLE 3

In a rotary evaporator, there are charged 100 parts of cylindrical pellets of polymetaxylylene adipamide (molecular weight, 10,500) of 1.5 mm. in diameter and 2 mm. in length, and the evaporator is heated at 80° to 90° C. 0.4 part of a support material consisting of a mixture of styrenated phenol and p-t-butylphenol-acetaldehyde condensate ($m$=2 or 3) in a molar ratio of 1:1 is heated at 100° to 120° C. and added to the said pellets. The resultant mixture is mixed up for about 20 minutes. After addition of fine powder of manganese hypophosphite thereto to make 500 p.p.m. in terms of manganese, the resulting mixture is mixed up for 20 minutes. When the thus-obtained pellets are shaken as in Example 1, the retention rate of manganese hypophosphite is nearly 100 percent.

Example 4

To 200 parts of pellets of polyhexamethylene adipamide (molecular weight, 15,000) of 1.5 mm. in diameter and 1.5 mm. in length, 1.2 parts of styrenated phenol are added, and the resultant mixture is mixed up at 60° C. A mixture of 1.0 part of xylenol-acetaldehyde condensate ($m$=2 or 3) and 0.3 part of carbon black is attached to the pellets. The resultant pellets are supplied to a screw-spinning machine by the aid of a vibration feeder without elimination of the additive in a transportation pipe.

What is claimed is:

1. In a method for the fixation of at least one additive on pellets of polyamides wherein a support material is first coated onto the pellets followed by a coating of at least one additive, an improvement wherein the support material is a phenol derivative of the formula:

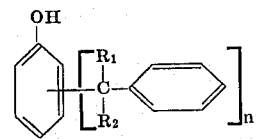

wherein $R_1$ and $R_2$ are each hydrogen or alkyl having not more than 4 carbon atoms and $n$ is an integer of 1 to 3.

2. The method according to claim 1, in which the amount of the phenol derivative is 0.05 to 0.5 percent by weight to the pellets.

3. The method according to claim 1, in which the phenol derivative is used together with a polyphenol derivative of the formula:

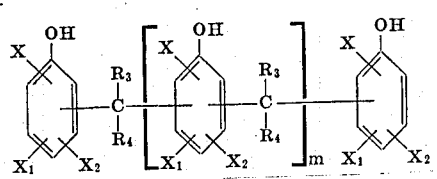

wherein X, $X_1$, and $X_2$ are each hydrogen, hydroxyl, alkyl having not more than 12 carbon atoms or alkoxy having not more than 12 carbon atoms, at least one of them being not hydrogen, $R_3$ and $R_4$ are each hydrogen, alkyl having not more than four carbon atoms or alkenyl having not more than four carbon atoms and $m$ is an integer of 2 to 6.

4. The method according to claim 3, in which the weight ratio of the phenol derivative and the polyphenol derivative is from 5:10 to 20:10.

5. The method according to claim 3, in which the amount of the phenol derivative and the polyphenol derivative is 0.05 to 0.5 percent by weight to the pellets.

6. The method according to claim 3, in which the additive is the copper salt of an organic acid.

7. The method according to claim 3, in which the additive is 2-mercaptobenzimidazole.

* * * * *